(12) United States Patent
Leonard

(10) Patent No.: US 9,764,614 B2
(45) Date of Patent: Sep. 19, 2017

(54) SUSPENSION ACTUATION ASSEMBLIES AS WELL AS SUSPENSION SYSTEMS INCLUDING SAME

(71) Applicant: FIRESTONE INDUSTRIAL PRODUCTS COMPANY, LLC, Indianapolis, IN (US)

(72) Inventor: Joshua R. Leonard, Noblesville, IN (US)

(73) Assignee: Firestone Industrial Products Company, LLC, Indianpolis, IN (US)

( * ) Notice: Subject to any disclaimer, the term of this patent is extended or adjusted under 35 U.S.C. 154(b) by 0 days.

(21) Appl. No.: 14/796,596

(22) Filed: Jul. 10, 2015

(65) Prior Publication Data
US 2016/0009159 A1    Jan. 14, 2016

Related U.S. Application Data

(60) Provisional application No. 62/023,016, filed on Jul. 10, 2014.

(51) Int. Cl.
*B60G 99/00*      (2010.01)

(52) U.S. Cl.
CPC .......... *B60G 99/002* (2013.01); *B60G 99/00* (2013.01); *B60G 2202/40* (2013.01); *B60G 2206/60* (2013.01); *B60G 2300/026* (2013.01)

(58) Field of Classification Search
CPC .. B60G 99/002; B60G 99/00; B60G 2202/40; B60G 2300/026; B60G 2206/60
USPC .......... 296/65.02, 65.12, 65.14, 65.15, 65.18
See application file for complete search history.

(56) References Cited

U.S. PATENT DOCUMENTS

| | | | | | |
|---|---|---|---|---|---|
| 3,883,172 | A | * | 5/1975 | Barton | B60N 2/502 296/65.02 |
| 3,986,748 | A | * | 10/1976 | Magnuson | B60N 2/501 296/65.02 |
| 6,109,689 | A | * | 8/2000 | Nanni | B60N 2/2821 248/638 |
| 7,568,675 | B2 | * | 8/2009 | Catton | B60N 2/502 248/421 |
| 8,282,149 | B2 | * | 10/2012 | Kniffin | B60N 2/501 296/65.02 |
| 2006/0237885 | A1 | * | 10/2006 | Paillard | B60N 2/501 267/140.15 |
| 2009/0189407 | A1 | * | 7/2009 | Lewis, II | B60N 2/24 296/65.02 |

* cited by examiner

*Primary Examiner* — Jason S Morrow
*Assistant Examiner* — E Turner Hicks
(74) *Attorney, Agent, or Firm* — Brian D. McAlhaney; Fay Sharpe LLP

(57) ABSTRACT

A suspension actuation assembly can include first and second support assemblies that are displaceable relative to one another in a first direction of travel. A connector assembly can extend between and operatively connect the first and second support assemblies. An actuator assembly can be displaceable between collapsed and extended conditions. The actuator assembly can be oriented transverse to the first direction of travel and can be operatively associated with the connector element such that displacement of the actuator assembly generates displacement of the first and second support assemblies relative to one another along the first direction of travel. A suspension system including such a suspension actuation assembly is also included.

16 Claims, 7 Drawing Sheets

SUSPENSION ACTUATION ASSEMBLIES AS WELL AS SUSPENSION SYSTEMS INCLUDING SAME

This application claims the benefit of priority from U.S. Provisional Patent Application No. 62/023,016, filed on Jul. 10, 2014, the subject matter of which is hereby incorporated herein by reference in its entirety.

BACKGROUND

The subject matter of the present disclosure broadly relates to the art of support structures and suspension systems and, more particularly, to a suspension system that includes at least one connector element secured in a first direction between supported and supporting structures. Such a suspension system can also include a spring or actuator operatively connected with the at least one connector element. The spring or actuator can be operative to extend and contract in a second direction that is transverse to the first direction and thereby alter the distance between the supported and supporting structures in the first direction.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with pressurized gas reservoirs of non-wheeled vehicles and/or support structures associated with industrial machinery, components thereof and/or other such equipment. Accordingly, the subject matter of the present disclosure is not intended to be limited to use associated with pressurized gas systems of wheeled vehicles.

In some cases, it has been deemed desirable to reduce the overall weight of motor vehicles, such as to improve fuel efficiency and/or to increase the transportable payload for the same gross weight vehicle. Reducing the weight of one or more components of a suspension system of vehicles, such as those supporting an operator or operator compartment (e.g., cab) can be one contributing factor to achieving such a goal. In many cases, conventional suspension systems have been designed and constructed from metal materials to provide desired performance characteristics, such as strength, rigidity, and robustness of connection with the associated components and/or structures. Reducing the size of such components could be useful in contributing to the reduced weight of a vehicle suspension system, such as has been described above. However, it has been recognized that such size reductions can, in some cases, result in a corresponding reduction in performance.

Notwithstanding the widespread usage and overall success of conventional designs for suspension systems that are known in the art, it is believed that a need exists to meet these competing goals while still retaining comparable or improved performance, ease of manufacture, ease of assembly, ease of installation and/or reduced cost of manufacture, and/or otherwise advancing the art of support structures and suspension systems associated therewith.

BRIEF DESCRIPTION

One example of a suspension actuation assembly in accordance with the subject matter of the present disclosure can be dimensioned to operatively interconnect associated structural components. The suspension actuation assembly can include a first support assembly that is dimensioned for securement to one of the associated structural components. The first support assembly can include a first mounting feature. A second support assembly can be dimensioned for securement to another one of the associated structural components. The second support assembly can include a second mounting feature. The second support assembly can be operatively connected to the first support assembly such that the first and second support assemblies are displaceable relative to one another in a first direction of travel. A connector element can extend between and operatively connect the first and second mounting features. An actuator assembly can be displaceable between a collapsed condition and an extended condition. The actuator assembly can be oriented transverse to the first direction of travel. The actuator assembly can be operatively associated with the connector element such that displacement of the actuator assembly from the collapsed condition toward the extended condition can generate displacement of the first and second support assemblies relative to one another along the first direction of travel.

One example of a suspension system in accordance with the subject matter of the present disclosure can be dimensioned for securement between associated structural components, such as a supporting structure and a supported structure. The suspension system can include at least one connector element that is operatively connected in a first direction between the supporting and supported structures. The suspension system can also include a spring or actuator element operatively connected to the at least one connector element. The spring or actuator element can be operative to extend and/or contract in a second direction that is transverse to the first direction. During use, a force applied to the at least one connector element in the second direction will generate a corresponding force in the first direction such that extension and contraction of the spring or actuator element can alter the distance between the supported and supporting structures in the first direction.

One example of a vehicle in accordance with the subject matter of the present disclosure can include a supporting structure and a supported structure that are displaceable relative to one another in a first direction of travel. A first mounting feature can be operatively associated with the supporting structure. A second mounting feature can be operatively associated with the supported structure. A connector element can extend between and operatively connect the first and second mounting features. An actuator assembly can be displaceable between a collapsed condition and an extended condition. The actuator assembly can be oriented transverse to the first direction of travel and can be operatively associated with the connector element such that displacement of the actuator assembly from the collapsed condition toward the extended condition can generate displacement of the supporting and supported structures in the first direction of travel.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
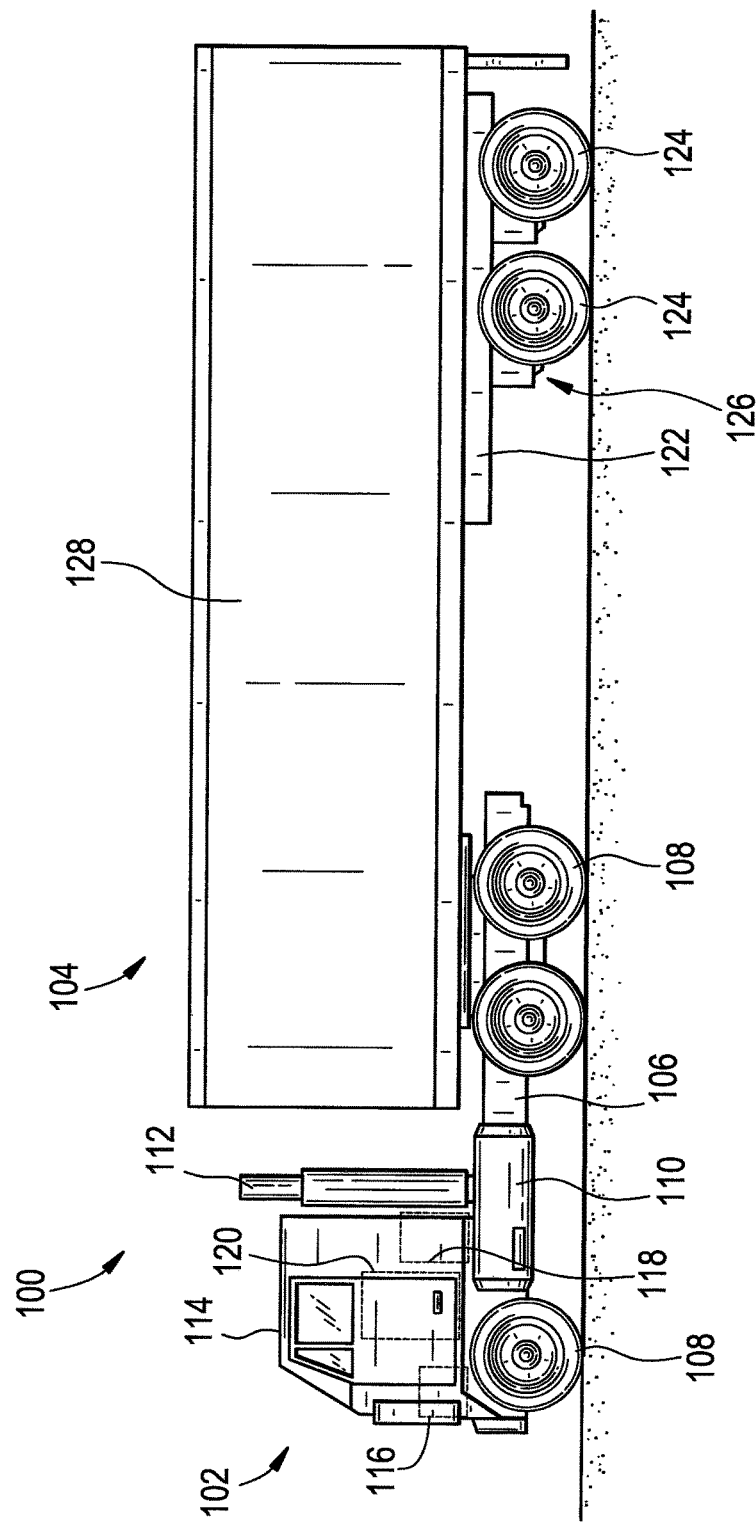
FIG. 1 is a graphical representation of one example of a vehicle including one or more suspension systems in accordance with the subject matter of the present disclosure.

With reference to FIG. 1, a vehicle 100 is shown as taking the form of a tractor-trailer combination that includes an over-the-road tractor 102 and a trailer 104 that is operatively connected to the tractor for over-the-road transport. Tractor 102 is shown as including a frame 106 that is supported on a plurality of wheels 108 by a tractor suspension system (not shown). Tractor 102 will typically also include an internal combustion engine (not shown) and drivetrain (not shown) that are supported on the frame and provide motive power to one or more of wheels 108. Tractor 102 can include a fuel tank 110 and an exhaust stack 112 that are operatively associated with the engine.

Tractor 102 can also include a passenger compartment or cab 114 that can be supported on or along frame 106 in any suitable manner, such as by way of one or more cab mounts and/or one or more cab suspensions, which are respectively represented in FIG. 1 by dashed boxes 116 and 118. Typically, a cab, such as cab 114, for example, will also include one or more seats supported within the cab for use by an operator and, in some cases, one or more passengers, such as is represented in FIG. 1 by dashed box 120, for example. Trailer 104 is shown as including a frame 122 that is supported on a plurality of wheels 124 by a trailer suspension system 126. Trailer 104 can also include a trailer body 128 that is at least partially supported on frame 122 and is generally dimensioned to receive and retain a quantity of cargo.

Figure 2:
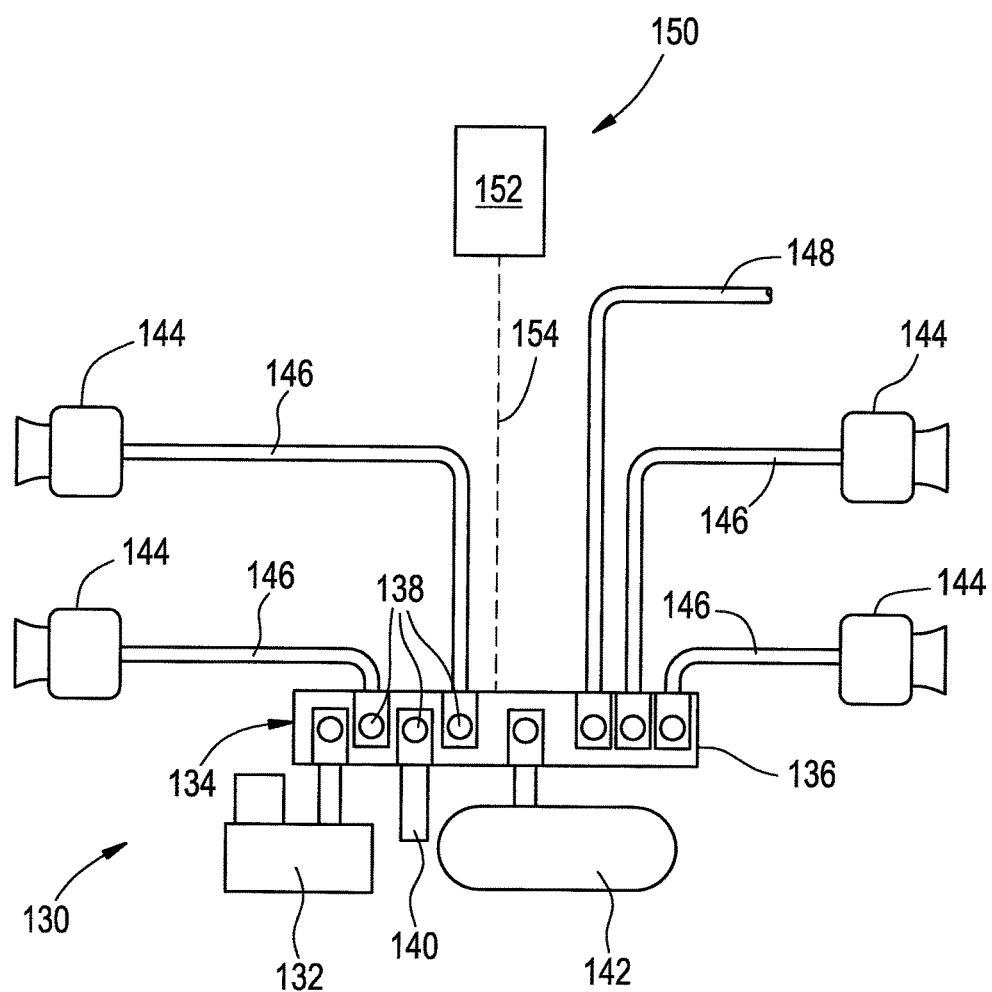
FIG. 2 is a greatly simplified schematic representation of one example of a pressurized gas system adapted for operative association with a suspension system in accordance with the subject matter of the present disclosure.

It will be appreciated that numerous components and/or systems of vehicle 100 can utilize pressurized gas (e.g., air) as a power source for the operation thereof. As non-limiting examples, such components and/or systems can include a tractor suspension system, a tractor braking system, a cab suspension, a trailer suspension system and/or a trailer braking system. One greatly-simplified example of a pressurized gas system 130 that can be operatively associated with one or more of the components and/or systems of vehicle 100 is shown in FIG. 2. Pressurized gas system 130 can be operatively associated with one or more components and/or systems of the vehicle in any suitable manner for selectively supplying pressurized gas (e.g., air) thereto and selectively transferring pressurized gas therefrom.

In the exemplary embodiment shown in FIG. 2, pressurized gas system 130 includes a pressurized gas source, such as a compressor 132, for example, for generating pressurized air or other gases. A control device, such as a valve assembly 134, for example, is shown as being in communication with compressor 132 and can be of any suitable configuration or arrangement. In the exemplary embodiment shown, valve assembly 134 includes a valve block 136 with a plurality of valves 138 supported thereon. Valve assembly 134 can also, optionally, include a suitable exhaust, such as a muffler 140, for example, for venting pressurized gas from the system. Pressurized gas system 130 can also, optionally, include a reservoir 142, which is shown as being in fluid communication with the compressor and/or the valve assembly and suitable for storing pressurized gas at an elevated pressure for an extended period of time, such as minutes, hours, days, weeks or months.

In some cases, the tractor suspension system and/or the trailer suspension system can include one or more gas spring assemblies 144, which can be of a conventional construction. In the arrangement shown in FIG. 2, valve assembly 134 is in communication with gas spring assemblies 144 through gas transfer lines 146. As such, pressurized gas can be selectively transferred into and/or out of the gas spring assemblies through valve assembly 134 by selectively operating valves 138. Pressurized gas system 130 can also, optionally, be operatively associated with one or more other components and/or systems, such as a gas spring or actuator operatively associated with one or more other suspension systems, for example. As such, pressurized gas system 130 is shown as including a gas transfer line 148 that is operatively associated with one of valves 138 of valve assembly 134. It will be appreciated that gas transfer line 148 can be utilized to selectively transfer pressurized gas into and/or out of any such gas spring assemblies, actuators and/or other components, such as may be described hereinafter, for example. As indicated above, it will be appreciated that pressurized gas system 130 is greatly simplified and merely illustrates one example of a pressurized gas system with which they pressurized gas reservoir in accordance with the subject matter of the present disclosure can be used.

In some cases, pressurized gas system 130 can include a control system 150 that is capable of communication with any one or more systems and/or components (not shown) of vehicle 100, such as for selective operation and/or control thereof. Control system 150 can include a controller or electronic control unit (ECU) 152 communicatively coupled with compressor 132 and/or valve assembly 134, such as through a conductor or lead 154, for example, for selective operation and control thereof, which can include supplying and exhausting pressurized gas to and/or from the pressurized gas system. It will be appreciated that controller 152 can be of any suitable type, kind and/or configuration.

It will be appreciated that the tractor suspension system and trailer suspension system 126 referred to above represent the primary suspension systems of vehicle 100 by which the sprung masses, such as frame 106, cab 114, frame 122 and trailer body 128, for example, are supported on the unsprung masses of the vehicle, such as one or more axles and wheels 108 and 124, for example. As mentioned above, a vehicle, such as vehicle 100, for example, can also include one or more secondary or other (i.e., non-primary) suspension systems that provided for increased performance and/or ride quality of the vehicle. Examples of components that can include or can be otherwise connected by way of such a secondary suspension system can include cab mounts 116 and/or cab suspensions 118 that operatively connect cab 114 with frame 106. Another example of components that can include or can be otherwise connected by way of such a secondary suspension system can include seat suspension 120 that operatively connects a seat for an operator and/or passenger with cab 114. It will be recognized and understood that a suspension system in accordance with the subject matter of the present disclosure may be suitable for use as any one or more of the foregoing and/or other examples of secondary suspension systems for vehicles and/or primary suspension systems in other applications and/or environments of use.

Figure 3:
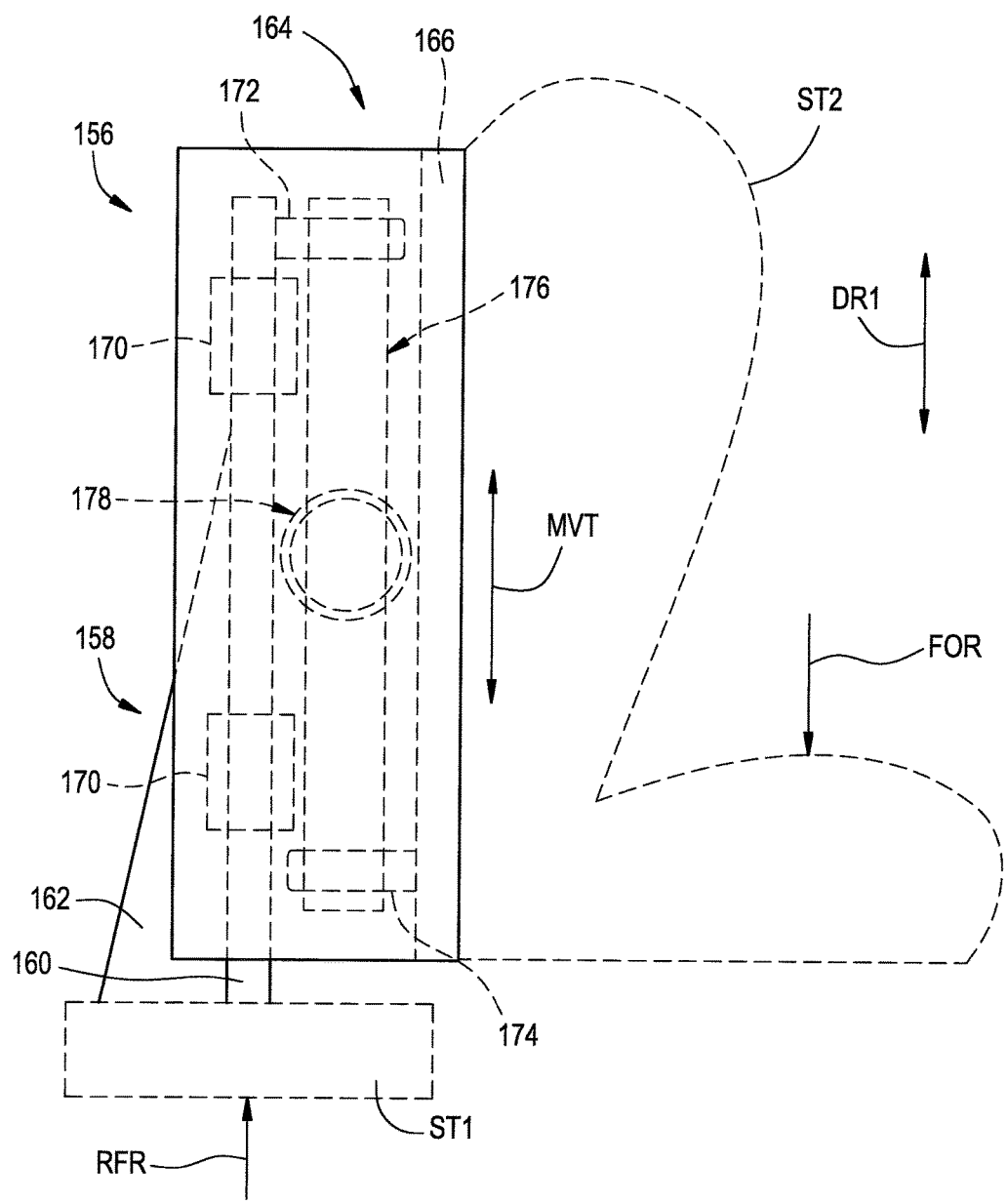
FIG. 3 side elevation view of one example of a suspension system in accordance with the subject matter of the present disclosure.

One example of a suspension system in accordance with the subject matter of the present disclosure is shown in FIGS. 3-7 as suspension system 156, which is shown and described herein as being operatively disposed between a first or supporting structure ST1 and a second or supported structure ST2. It will be appreciated that structures ST1 and ST2 can represent any suitable structural components that are operatively connected to one another and between which it may be desirable to permit relative movement. In some cases, one structural component may be deemed stationary with the other structural component deemed to be displaceable. In other case, both structural components may be deemed to be displaceable. In either case, structures ST1 and ST2 may be capable of undergoing movement relative to one another, as is represented in FIG. 3 by arrow MVT.

Typically, a suspension system in accordance with the subject matter of the present disclosure, such as suspension system 156, for example, will be utilized to support a load or otherwise transfer a force to, from and/or between structures ST1 and ST2. As one example, structure ST1 can be representative of a frame or floor of cab 114 and structure ST2 can be representative of a seat for an operator or passenger. In which case, suspension system 156 can be representative of a seat suspension that is capable of permitting structure ST2 (e.g., the seat) to move relative to structure ST1 (e.g., the frame or floor of the cab). Suspension system 156 can also transfer a force, which is represented by force arrow FOR (e.g., the weight of an operator), from structure ST2 to structure ST1, which can support force FOR, as is represented by reaction force arrow RFR in FIG. 3.

Figure 4:
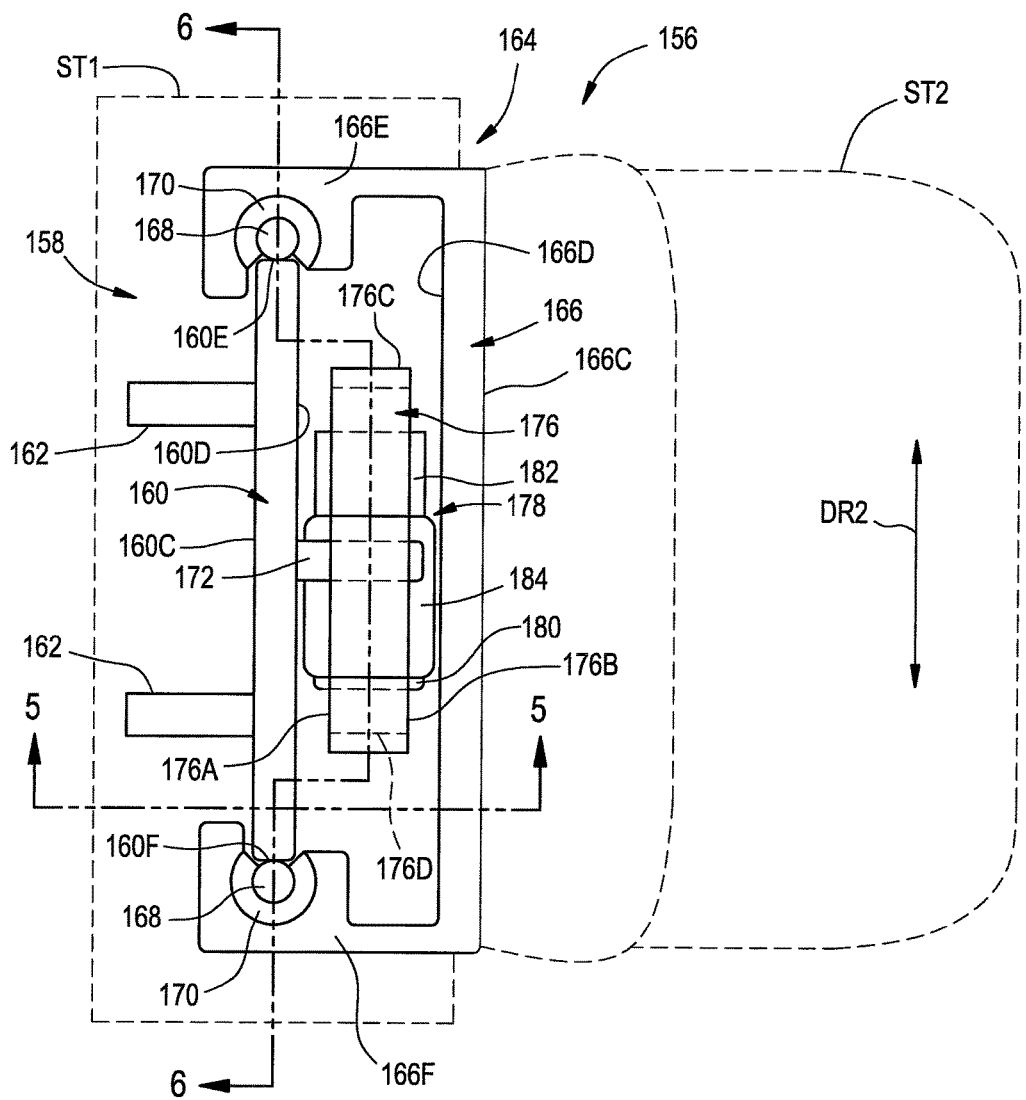
FIG. 4 is a top plan view of the suspension system in FIG. 3.

Suspension system 156 can include a first or supporting member (or assembly) 158 that is supported on and, in some cases, fixedly attached to structure ST1. First assembly 158 can include a base or supporting wall 160 that can be secured on or along structure ST1 in any suitable manner, such as by way of a flowed-material joint (not shown) and/or by one or more securement devices (not shown), such as threaded fasteners, for example. Depending upon the forces and loads associated with suspension system 156, first assembly 158 can, optionally, include one or more gussets or buttress walls 162 that can extend between base wall 160 and structure ST1. Base wall 160 can extend in a first or longitudinal direction, which is represented in FIG. 3 by arrow DR1, from a first or proximal end 160A disposed toward structure ST1 to a second or distal end 160B. Base wall 160 can also include a first side or surface 160C from which buttress walls 162 can extend and a second side or surface 160D facing opposite the first surface. Base wall 160 can extend in a second or lateral direction, which is represented in FIG. 4 by arrow DR2, that is transverse to the first direction between a first edge wall 160E and a second edge wall 160F disposed opposite the first edge wall.

Suspension system 156 can include a second or supported member (or assembly) 164 that is supported on or otherwise fixedly attached to structure ST2. Second assembly 164 can include a second or supported wall 166 that can extend in first direction DR1 between a first or proximal end 166A disposed toward structure ST1 and a second or distal end 166B. Second wall 166 can also include a first side or surface 166C facing away from base wall 160 and a second side or surface 166D facing toward base wall 160. Second wall 166 can extend in lateral direction DR2 between a first edge wall 166E and a second edge wall 166F disposed opposite the first edge wall.

In some cases, second assembly 164 can be operatively connected with first assembly 158 such that relative motion between the two assemblies is maintained along a predetermined path, such as a linear path or an arcuate path, for example. In some cases, displacement between the first and second assemblies may move through an arcuate path, such as in cab suspension applications, for example, as is schematically represented by line ARC in FIG. 5, for example. In other cases, displacement between the first and second assemblies may move through a substantially linear path, such as in seat suspension applications for example. It will be appreciated that the further examples discussed herein are merely exemplary and not intended to be limiting.

As shown in FIGS. 3-7, for example, assemblies 158 and 164 are operatively connected with one another such that moment loads (i.e., cantilevered loads) due to the a weight of the operator (e.g., force FOR) on the seat can be transferred from assembly 164 to assembly 158 while maintaining an approximately linear pathway of movement MVT in direction DR1. It will be appreciated that any suitable construction and/or configuration of components can be used to establish and maintain a desired predetermined path of movement. For example, first assembly 158 can include one or more bearing tracks that can be operatively connected to base wall 160 in a suitable manner, such as by way of a flowed material joint and/or one or more threaded fasteners, for example. In the arrangement shown in FIGS. 3-7, a bearing track 168 is secured along each of first and second edge walls 160E and 160F and extends along base wall 160 in direction DR1 from proximal end 160A toward distal end 160B.

Further to the foregoing example, second assembly 164 can include one or more bearings, bushing or other guides that are dimensioned to receive or otherwise cooperatively engage bearing tracks 168 for displacement therealong. In the arrangement shown in FIGS. 3-7, second assembly 164 includes two bearings 170 disposed along each of first edge wall 166E and second edge wall 166F. It will be appreciated, however, that other configurations and/or arrangements could alternately be used. Additionally, it will be appreciated that bearings 170 can be secured on or along second wall 166 in any suitable manner, such as by way of receipt within one or more mounting passages (not numbered) and retention by way of one or retaining rings (not shown) or other components, for example.

Suspension system 156 also includes one or more connector elements operatively connected between assemblies 158 and 164. It will be appreciated that the one of more connector elements can be secured on or along suitable features and/or components of assemblies 158 and 164 in any suitable manner. As one example, first assembly 158 can include a mounting feature operatively associated with one of the support structures, such as a mounting pin 172 that is secured to base wall 160 and projects outwardly from along second side 160D toward second wall 166. Additionally, second assembly 164 can include a mounting feature operatively associated with another one of the support structures, such as a mounting pin 174 that is secured to second wall 166 and projects outwardly from along second side 166D toward base wall 160. It will be appreciated, however, that any other suitable configuration and/or arrangement could alternately be used.

The one or more connector elements can be of any suitable type, kind, construction and/or configuration. As one example, a plurality of rigid or substantially-rigid connector elements (e.g., four connector elements) could be used and can be operatively connected with one another in any manner suitable for permitting pivotal motion between two or more of the connector elements. In some cases, two connector elements could be pivotally connected to mounting pin 172 and two connector elements could be pivotally connected to mounting pin 174. In such case, each of the connector elements from mounting pin 172 can be connected to a corresponding one of the connected elements from mounting pin 174 such that the assembly of connector elements can have a somewhat diamond-shaped configuration.

As another example, the one or more connector elements could take the form of one or more endless bands 176, which can extend between opposing edges 176A and 176B. Additionally, endless bands 176 can include an outer surface 176C and an inner surface 176D. It will be appreciated that endless bands 176 can be formed from any suitable material or combination of materials. In some cases, endless bands 176 can be substantially inelastic and formed from a suitable material or combination of materials, such as metal or a composite material including carbon fiber filaments and/or aramid-based synthetic filaments, for example.

In other cases, endless bands 176 can be formed from one or more elastomeric materials. For example, the endless bands can include one or more fabric-reinforced, elastomeric plies or layers and/or one or more un-reinforced, elastomeric plies or layers. In some cases, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Figure 5:
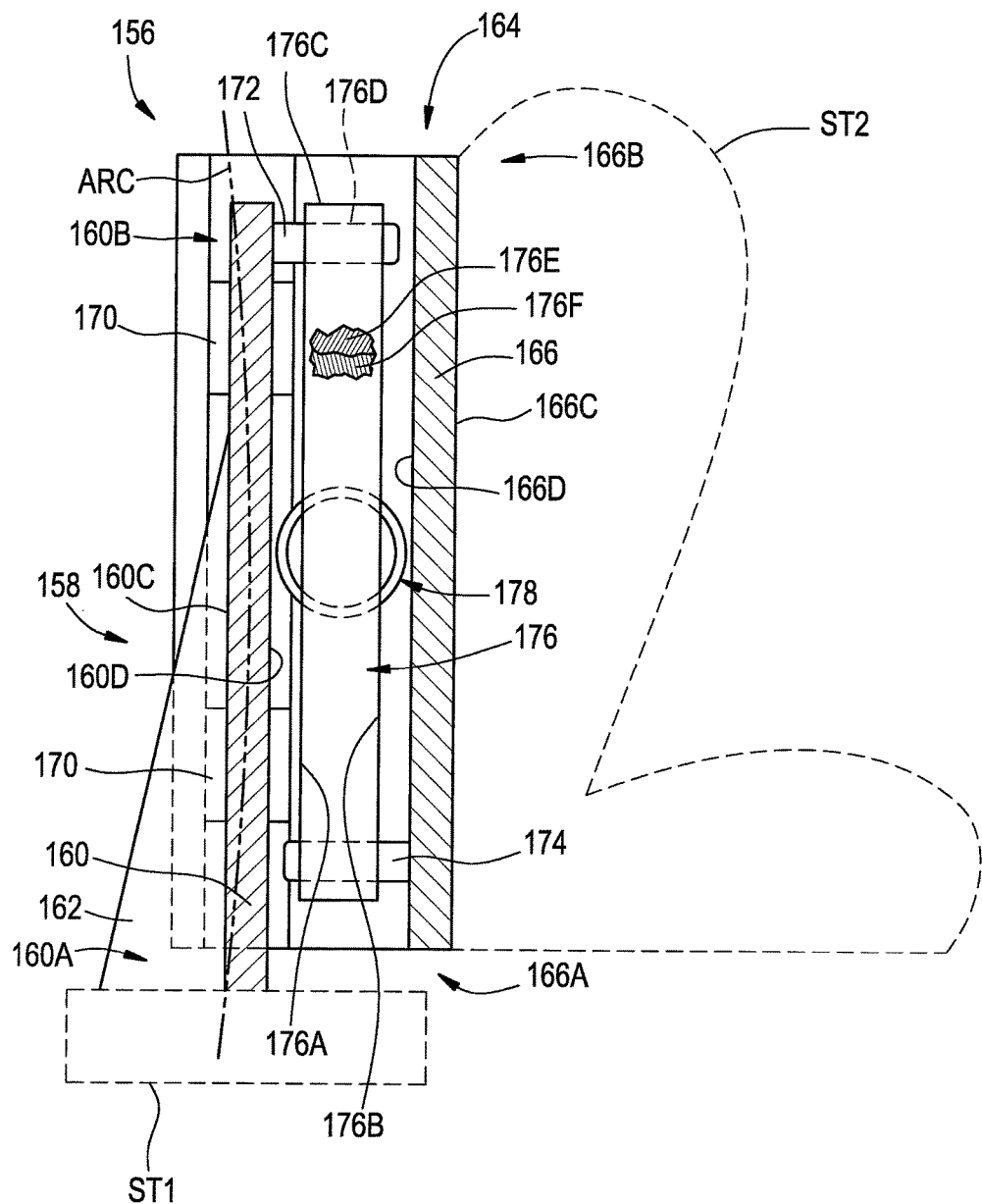
FIG. 5 is a side view, in partial cross section, of the suspension system in FIGS. 3 and 4 taken from along line 5-5 in FIG. 4.

As one example of a suitable construction, endless bands 176 can include an inner or liner ply (not shown) that at least partially forms inner surface 176D and an outer or cover ply (not shown) that at least partially forms outer surface 176C. In some cases, endless bands 176 can further include one or more reinforcing plies 176E and 176F that are disposed between inner and outer surfaces 176D and 176C. It will be appreciated that the one or more reinforcing plies, if included, can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an approximately equal but opposite bias angle, such as is represented in FIG. 5 by plies 176E and 176F, for example.

Suspension system 156 also includes one or more spring elements, actuator elements and/or other biasing elements operatively associated with the one or more connector elements, such as the plurality of rigid or substantially-rigid connector elements or the one or more endless bands, or any combination thereof. In a preferred arrangement, the one or more spring elements, actuator elements and/or other biasing elements are operative to urge opposing portions of the one or more connector elements in opposing directions that are generally transverse to the direction of displacement between the supporting and supported structures (e.g., transverse to first direction DR1).

Additionally, it will be appreciated that spring elements, actuator elements and/or other biasing elements of any suitable type, kind, construction and/or configuration could be used. For example, a coil spring (not shown), a solid rubber or thermoplastic elastomer spring (not shown) or any combination of the foregoing and other spring elements could be used. Additionally, or in the alternative, a gas spring assembly 178 could be used, such as shown in FIGS. 3-7, for example. In such case, gas spring assembly 178 can include a first end member 180 disposed toward a first portion 176G (FIG. 6) of endless band 176 and a second end member 182 disposed toward a second portion 176H (FIG. 6) of the endless band. A flexible spring member 184 can be operatively connected between end members 180 and 182 such that a substantially fluid-tight seal is formed therebetween. In this manner, gas spring assembly 178 can include a spring chamber 184A (FIG. 6) into and out of which pressurized gas can be transferred, such as by way of a gas transfer line 186 that can be suitable for fluidically communicating with gas transfer line 148 of pressurized gas system 130.

In some cases, end members 180 and/or 182 may be configured directly abuttingly engage inner surface 176D of endless bands 176. In other cases, conventional end member constructions could be used. In which case, suspension system 156 can, optionally, include one or more engagement blocks 188 and 190 that are dimensioned or otherwise configured for positioning between an end member and the inner surface of the portion of the endless bands. In the arrangement shown in FIGS. 6 and 7, for example, engagement block 188 is positioned between end member 180 and first portion 176G of endless band 176. Engagement block 190 is positioned between end member 182 and second portion 176H of endless band 176. It will be appreciated that the one or more engagement blocks, if included, can be of any suitably size, shape, construction and/or configuration suitable for minimizing or at least reducing wear and/or stress concentrations along endless bands 176 due to the biasing forces associated with gas spring assembly 178 or any other spring elements, actuator elements and/or other biasing elements that may be included or otherwise used.

Figure 6:
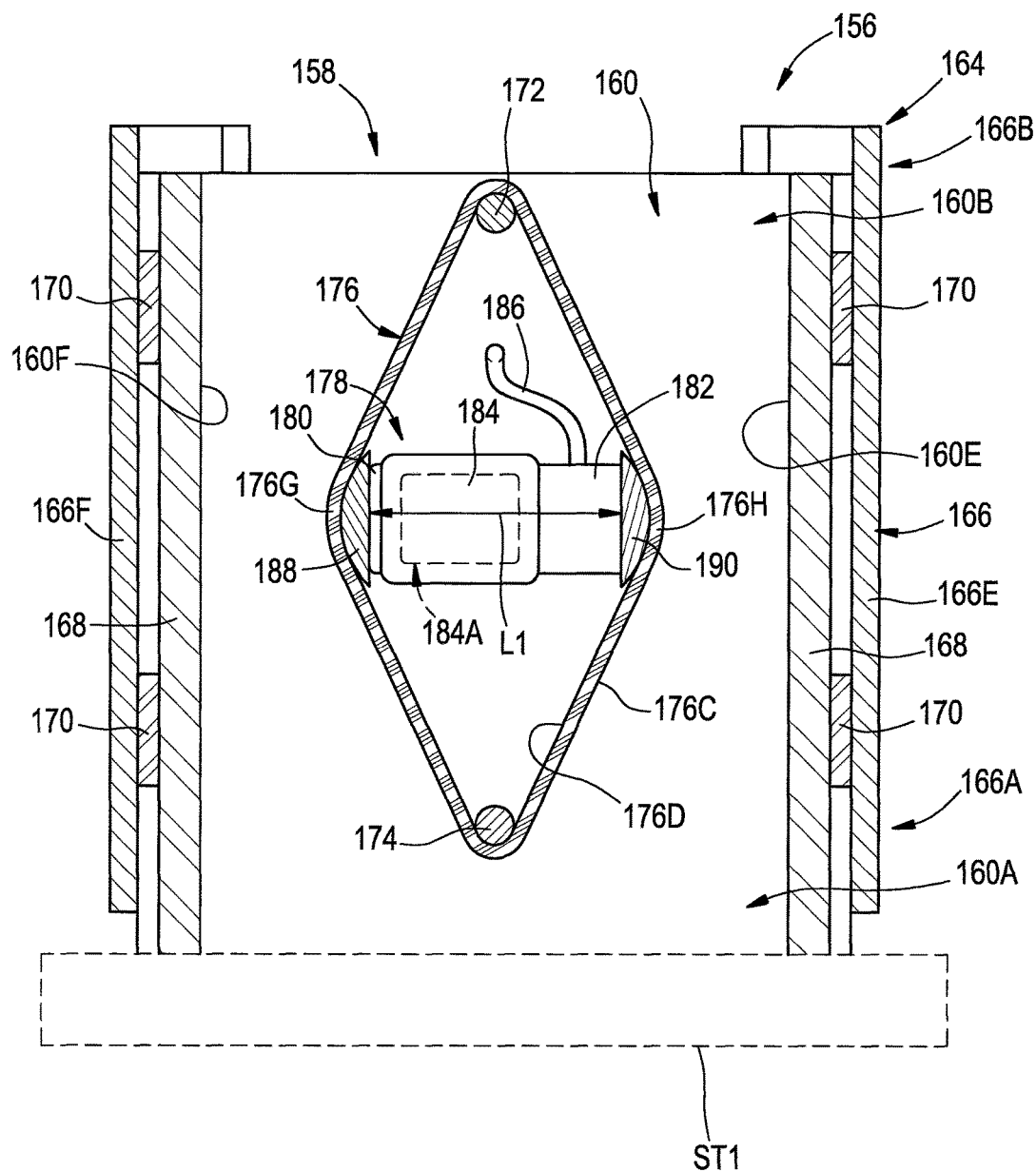
FIG. 6 is a front view, in partial cross section, of the suspension system in FIGS. 3-5 taken from along line 6-6 in FIG. 4 in a first position.
Figure 7:
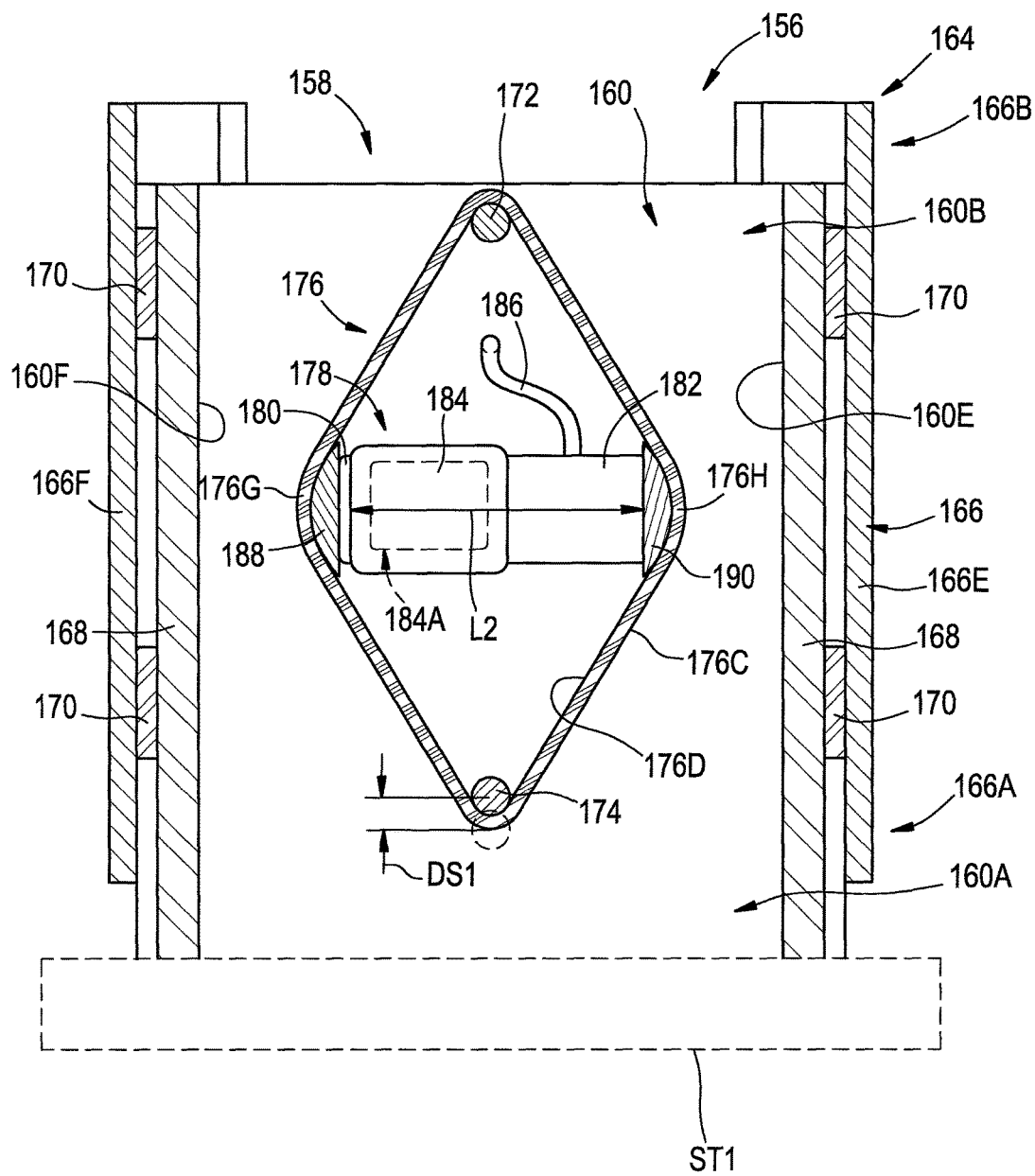
FIG. 7 is a front view, in partial cross section, of the suspension system in FIG. 6 shown in a second position.

FIGS. 6 and 7 illustrate displacement of suspension system 156 such as may occur during use in motor vehicle and/or other applications. As shown in FIG. 6, gas spring assembly 178 has a first length, which is represented by reference dimension L1 in FIG. 6. As shown in FIG. 7, gas spring assembly 178 has a second length, which is represented by reference dimension L2, that is greater than length L1 in FIG. 6. As the length of the spring or actuator element (e.g., gas spring assembly 178) is increased, the distance between mounting pins 172 and 174 is decreased, as is represented in FIG. 7 by reference dimension DS1. It will be appreciated that the amount by which the distance between mounting pins 172 and 174 is decreased will have a relation to the length, elasticity and configuration of the endless bands as well as other geometric factors. In the construction illustrated in FIGS. 3-7, such an increase in the length of the gas spring assembly will result in the raising of supported assembly 164 (and the seat attached thereto) relative to supporting assembly 158.

Additionally, it will be appreciated that by reversing the position of pins 172 and 174, a suspension system capable of generating compressive forces (e.g., clamping forces), rather than extension or lifting forces, can be provided. As such, it will be appreciated that a suspension system in accordance with the subject matter of the present disclosure will generally provide support and force generation in one particular direction (e.g., extension or compression). In cases in which dual-directional forces may be useful, two or more suspension systems in accordance with the subject matter of the present disclosure could be used with one or more suspension system configured for operation in one direction and one or more other suspension systems configured for operation in the opposing direction.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A vehicle comprising:
   a supporting structure of said vehicle;
   a supported structure of said vehicle that is displaceable relative to said supporting structure in a first direction of travel;
   a first support member secured to said supporting structure;
   a second support member secured to said supported structure;
   a first mounting feature operatively associated with said supporting structure, said first mounting feature including a first mounting pin projecting outwardly from said first support member in a direction transverse to said first direction of travel;
   a second mounting feature operatively associated with said supported structure, said second mounting feature includes a second mounting pin projecting outwardly from said second support member, said second mounting pin positioned in offset relation to said first mounting pin and oriented in approximate alignment with said first mounting pin;
   a connector element extending between and operatively connecting said first and second mounting features, said connector element including at least one endless band having an inner surface disposed in abutting engagement with said first and second mounting pins; and,
   an actuator assembly displaceable between a collapsed condition and an extended condition, said actuator assembly oriented transverse to said first direction of travel and operatively associated with said connector element such that displacement of said actuator assembly from said collapsed condition toward said extended condition generates displacement of said supporting and supported structures in said first direction of travel.

2. A vehicle according to claim 1, wherein said at least one endless band is at least partially formed from an elastomeric material and includes at least one fabric-reinforced ply at least partially embedded within said elastomeric material.

3. A vehicle according to claim 2, wherein said actuator assembly includes a first end member, a second end member spaced apart from said first end member, and a flexible spring member that is operatively connected in a substantially fluid-tight manner between said first and second end members such that a spring chamber is at least partially formed by said flexible spring member between said first and second end members.

4. A suspension actuation assembly dimensioned to operatively interconnect associated structural components, said suspension actuation assembly comprising:
   a first support assembly dimensioned for securement to one associated structural component, said first support assembly including a first mounting feature;
   a second support assembly dimensioned for securement to another associated structural component, said second support assembly including a second mounting feature, said second support assembly operatively connected to said first support assembly such that said first and second support assemblies are displaceable relative to one another in a first direction of travel;
   a connector element extending between and operatively connecting said first and second mounting features, said connector element including at least one endless band at least partially formed from an elastomeric material, said at least one endless band including opposing edges, an outer surface extending between said opposing edges, and an inner surface extending between said opposing edges and facing opposite said outer surface; and,
   an actuator assembly displaceable between a collapsed condition and an extended condition, said actuator assembly oriented transverse to said first direction of travel and operatively associated with said connector element such that displacement of said actuator assembly from said collapsed condition toward said extended condition generates displacement of said first and second support assemblies relative to one another along said first direction of travel.

5. A suspension actuation assembly according to claim 4, wherein said actuator assembly includes a first end member, a second end member spaced apart from said first end member, and a flexible spring member that is operatively connected in a substantially fluid-tight manner between said first and second end members such that a spring chamber is at least partially formed by said flexible spring member between said first and second end members.

6. A suspension actuation assembly according to claim 5 further comprising:
   a first engagement block operatively disposed between said first end member and said connector element; and,
   a second engagement block operatively disposed between said second end member and said connector element.

7. A suspension actuation assembly according to claim 4, wherein said connector element includes at least one layer of fabric-reinforced material at least partially embedded within said elastomeric material.

8. A suspension actuation assembly according to claim 4, wherein said first mounting feature includes a first mounting pin projecting outwardly from said first support assembly in a direction transverse to said first direction of travel, and said second mounting feature includes a second mounting pin projecting outwardly from said second support assembly, said second mounting pin positioned in offset relation to said first mounting pin and oriented in approximate alignment with said first mounting pin.

9. A suspension actuation assembly according to claim 8, wherein said inner surface of said at least one endless band extends outwardly around and abuttingly engages said first and second mounting pins.

10. A suspension actuation assembly according to claim 4, wherein said first and second support assemblies are operatively connected with one another such that said first and second support assemblies are displaceable along said first direction of travel along one of a linear path and a curvilinear path.

11. A suspension actuation assembly according to claim 4 further comprising:
   at least one bearing track extending along said first support assembly in said first direction of travel; and,
   at least bearing operatively disposed along said second support assembly, said at least one bearing complimentary to said at least one bearing track such that upon engagement of said at least one bearing and said at least one bearing track with one another said first and second support assemblies are displaceable relative to one another in said first direction of travel.

12. A suspension actuation assembly according to claim 11, wherein said first support assembly includes a base wall with two bearing tracks disposed in spaced relation to one another along said base wall, and said second support assembly includes a base wall with at least four bearings secured thereto, said at least four bearings positioned along said base wall of said second support assembly such that two bearings are operatively associated with each of said bearing tracks.

13. A suspension actuation assembly according to claim 4, wherein said connector element is operatively engaged with said first and second mounting features such that upon extension of said actuator assembly said first and second support assemblies are displaced away from one another along said first direction of travel such that a lifting or separation force is generated therebetween.

14. A suspension actuation assembly according to claim 4, wherein said connector element is operatively engaged with said first and second mounting features such that upon extension of said actuator assembly said first and second support assemblies are displaced toward one another along said first direction of travel such that a compression or clamping force is generated therebetween.

15. A suspension system dimensioned to operatively connect associated structures for displacement relative to one another, said suspension system comprising:
   a supporting structure;
   a supported structure that is displaceable relative to said supporting structure in said first direction of travel; and,
   a suspension actuation assembly according to claim 4 operatively disposed between said supporting structure and said supported structure such that said first support assembly is operatively attached to said supporting structure and said second support assembly is operatively attached to said supported structure.

16. A suspension system dimensioned to operatively connect associated structures for displacement relative to one another, said suspension system comprising:
   a pressurized gas system including a pressurized gas source and a control device; and,
   a suspension actuation assembly according to claim 5 with said gas spring assembly disposed in fluid communication with said pressurized gas source through said control device such that pressurized gas can be selectively transferred into and out of at least said spring chamber.

* * * * *